US005988591A

United States Patent [19]

Akimoto et al.

[11] Patent Number: 5,988,591

[45] Date of Patent: Nov. 23, 1999

[54] SPOOL

[75] Inventors: Takashi Akimoto; Masamichi Tajima; Makoto Ishikawa, all of Ibaraki, Japan

[73] Assignee: SMC Corporation, Tokyo, Japan

[21] Appl. No.: 09/175,472

[22] Filed: Oct. 20, 1998

[30] Foreign Application Priority Data

Nov. 11, 1997 [JP] Japan .................................... 9-325331

[51] Int. Cl.$^{6}$ ............................... F16K 3/24; F15B 13/02

[52] U.S. Cl. .................... 251/324; 137/625.69; 277/552; 277/561; 277/586

[58] Field of Search ....................... 137/625.69; 251/324; 277/552, 561, 586

[56] References Cited

U.S. PATENT DOCUMENTS

| | | | |
|---|---|---|---|
| 5,002,290 | 3/1991 | Pernin . | |
| 5,171,025 | 12/1992 | Stoll et al. . | |
| 5,513,674 | 5/1996 | Frisch | 137/625.69 |
| 5,609,343 | 3/1997 | Asou et al. | 137/625.69 X |

FOREIGN PATENT DOCUMENTS

| | | |
|---|---|---|
| 0 101 275 | 2/1984 | European Pat. Off. . |
| 0 427 554 | 5/1991 | European Pat. Off. . |
| 0 627 582 | 12/1994 | European Pat. Off. . |
| 0 866 252 | 9/1998 | European Pat. Off. . |
| 87 05 592 | 7/1987 | Germany . |
| 7-17892 | 4/1995 | Japan . |
| 25218176 | 1/1997 | Japan . |
| 1 224 219 | 3/1971 | United Kingdom . |

*Primary Examiner*—Gerald A. Michalsky
*Attorney, Agent, or Firm*—Oblon, Spivak, McClelland, Maier & Neustadt, P.C.

[57] ABSTRACT

A packing mounting groove formed in a spool has a wider portion of a large groove width and a narrower portion of a small groove width, and a packing that is mounted in the packing mounting groove has a first portion that fits in the wider portion and a second portion that fits in the narrower portion. A plurality of fixing protrusions formed concentrically on both sides of the second portion are pressure-contacted with a groove wall of the narrower portion to fixedly mount the packing in the mounting groove.

5 Claims, 3 Drawing Sheets

SPOOL

FIELD OF THE INVENTION

The present invention relates to a spool that is built into a spool valve to switch air channels.

DESCRIPTION OF RELATED ART

Spools of this kind comprise a bar-shaped spool body including at least one constricted portion forming an air channel, at least one seal land located adjacent to the constricted portion, and an annular packing mounting groove formed in the seal land in the circumferential direction; and an annular packing mounted in the packing groove.

The packing generally has an elliptical cross section that is constricted in the middle, and fits into the packing mounting groove. The packing may float from the packing mounting groove to increase sliding resistance or slip out from the groove. In other words, when the spool is used to switch channels, the sliding resistance effected between the packing and the inner circumferential surface of a valve hole or the fluid pressure acting on the packing may deform the packing or pull it outward to create a gap between the packing and the packing mounting groove. Compressed air can then flow through this gap into the space between the inner circumferential surface of the packing and the bottom of the groove to push the packing toward the outer circumference of the groove, causing it to float and thereby increasing sliding resistance or causing the packing to slip out from the mounting groove.

To solve this problem, the applicant has proposed a spool having a function for preventing the packing from floating, as disclosed in, for example, Japanese Utility Model No. 2521876. This spool has seal lips on both sides of the packing, and the seal lips are constantly abutted on the wall of the packing mounting groove to hinder compressed air from flowing into the space in the bottom of the groove. Thus, the space in the bottom of the groove is sealed against any inflow of air, and when the packing starts to float, a negative pressure acts on the space in the bottom of the groove to preclude such floating.

In this improved spool, however, the packing contains the seal lips, and when the packing is fitted in the packing mounting groove, the seal lips move toward the bottom of the groove while abutting on the side wall of the groove to compress the air therein. Consequently, air resistance may affect a mounting operation or compressed air may be contained in the space at the bottom of the groove.

SUMMARY OF THE INVENTION

It is a main object of this invention to provide a spool that allows a packing to be fixedly mounted in a mounting groove without providing seal lips on the packing, and that possesses both a simple structure and high sealing accuracy.

It is another object of this invention to provide a spool of this configuration that improves the flexibility of the packing to reduce sliding resistance during switching.

To achieve these objects, this invention provides a spool comprising a packing mounting groove and a packing mounted in the mounting groove.

The mounting groove includes a wider portion located on the opening side of the groove and a narrower portion located on its bottom side. The wider portion is formed so as to be deeper than the narrower portion.

At the same time, the packing comprises a first portion that fits in the wider portion and a second portion that fits in the narrower portion; on both sides of the second portion, a plurality of concentric fixing protrusions in pressure-contact with the groove wall of the narrower portion are disposed so as to fix the packing in the mounting groove. Also, at least one ventilating recessed groove portion that crosses the fixing protrusions in the radial direction of the packing, is provided.

In a spool of this configuration according to this invention, the packing fitting in the mounting groove is fixed therein because the fixing protrusions formed on the second portion are pressure-contacted with the groove wall a of the narrower portion. In this case, the plurality of fixing protrusions are pressure-contacted with the groove wall of the narrower portion while being compressed, so the packing is very firmly fixed and prevented from floating or slipping out from the mounting groove, thereby ensuring that an excellent sealing function is available.

In addition, the groove bottom space between the inner circumferential surface of the packing and the bottom of the mounting groove is in communication with the exterior of the groove through the recessed groove portion crossing the fixing protrusions, thereby preventing compressed air from being contained in the groove bottom space and precluding the packing from floating due to the presence of such air.

Furthermore, since the mounting groove is divided into wider and narrower portions, with the wider portion deeper than the narrower one, the first portion of the packing that fits into the groove has a larger radial length than the second portion, and is fitted into the wider portion in such a way as to maintain a space between itself and the groove wall. As a result, during the sliding of the spool, the first portion deforms flexibly in the wider portion, thereby reducing sliding resistance in the spool.

According to one embodiment of this invention, each of the fixing protrusions is formed so as to be continuously linear, and is partly cut out to form the recessed groove portion.

According to another specific embodiment of this invention, each of the fixing protrusions is formed by annularly arranging a plurality of small protrusions, with the gap between the adjacent small protrusions forming the recessed groove portion.

According to this invention, the first portion of the packing can be formed so as to be thinner than the second portion.

In addition, according to this invention, a constricted portion can be provided in at least part of the intermediate area between the first and second portions.

DETAILED DESCRIPTION OF THE INVENTION

Figure 1:
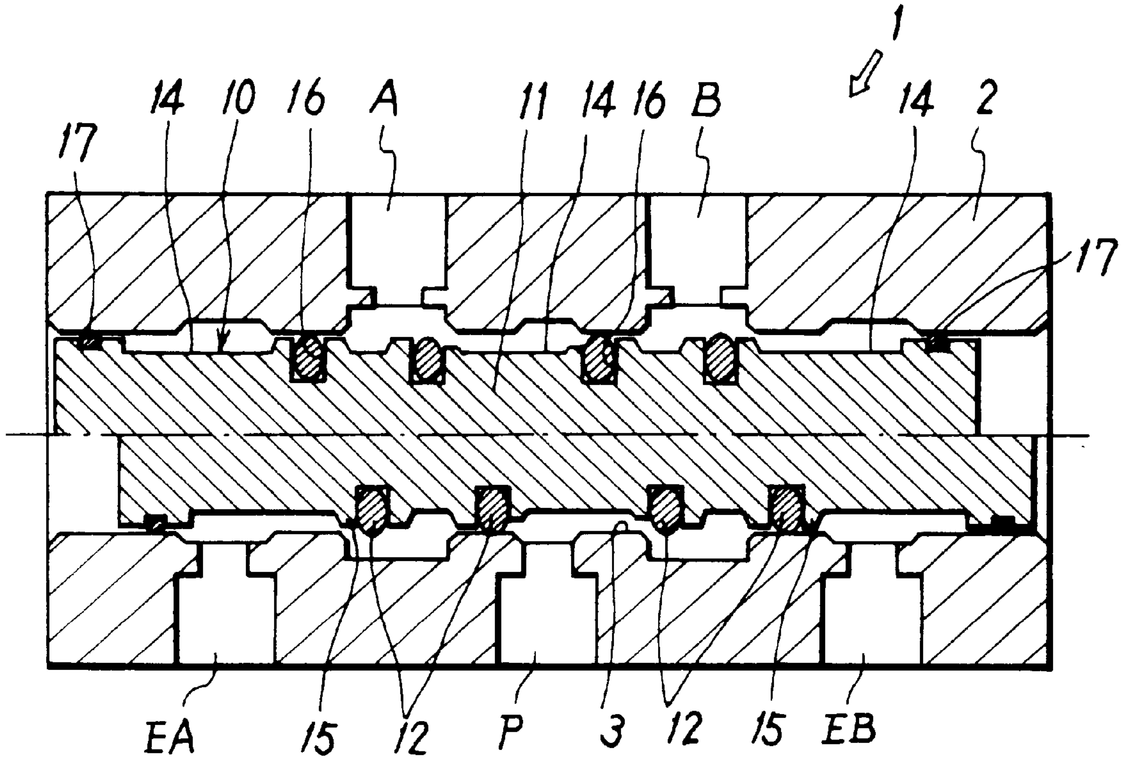
FIG. 1 is a sectional view showing an example of a spool valve using a spool according to this invention.

FIG. 1 shows an example of a spool valve for which a spool according to this invention is used. A valve body of a spool valve 1 comprises a supply port P, output ports A and B, and ejection ports EA and EB, and a valve hole 3 into which these ports are opened.

A spool 10 is slidably inserted into the valve hole 3 in an airtight manner and is driven by an appropriate drive means (not shown) to alternately connect the output ports A and B to either the supply port P or the ejection port EA or EB. The spool 10 is composed of a bar-shaped spool body 11 and, as shown in FIG. 2 an annular packing 12A mounted in the spool body 11.

The spool body 11 comprises a plurality of constricted portions 14 constituting an air channel; a plurality of seal lands 15 each located adjacent to the constricted portion 14; and a plurality of packing mounting grooves 16 formed on the outer circumferences of the seal lands 15, with the annular packing 12A fitted into each of the packing mounting grooves 16. In FIG. 1, annular seal members 17 that seal between the spool body 11 and the valve hole 3 are fitted into grooves near the respective axial ends of the spool body 11.

Figure 2:
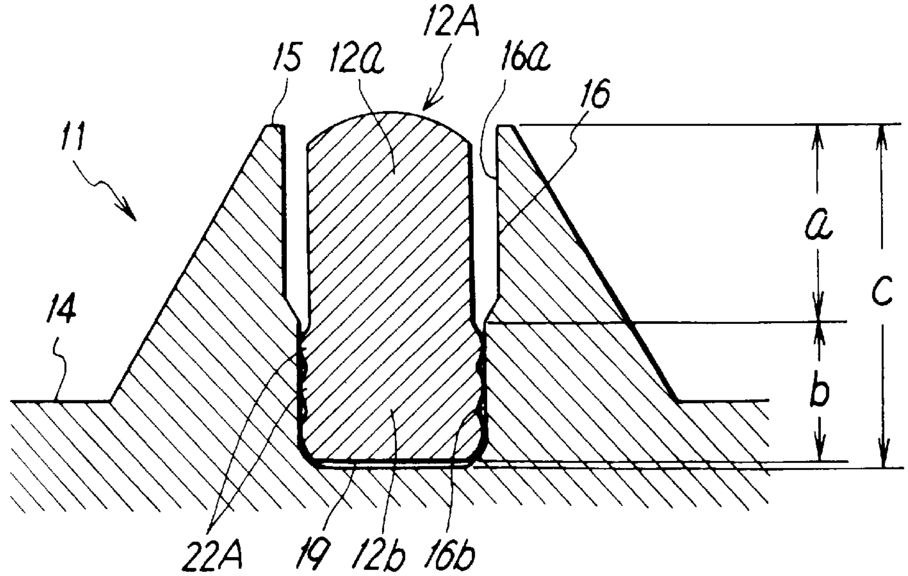
FIG. 2 is an enlarged sectional view of the integral part of the spool.

As shown in FIG. 2, the packing mounting groove 16 consists of a wider portion 16*a* located on the opening side and a narrower portion 16*b* located on the bottom, with the narrower portion 16*b* formed so as to have a depth (b) half or less that of the entire depth (c) of the mounting groove. In other words, the depth (a) of the wider portion is formed so as to be larger than the depth (b) of the narrower portion.

On the other hand, the packing 12A consists of a flexible material such as rubber, synthetic rubber, or synthetic resin which has a sealing capability, and consists of a first portion 12*a* located on the outer circumference and fitting the wider portion 16*a* of the mounting groove 16 and a second portion 12*b* located on the inner circumference and fitting the narrower portion 16*b*.

Figure 3:
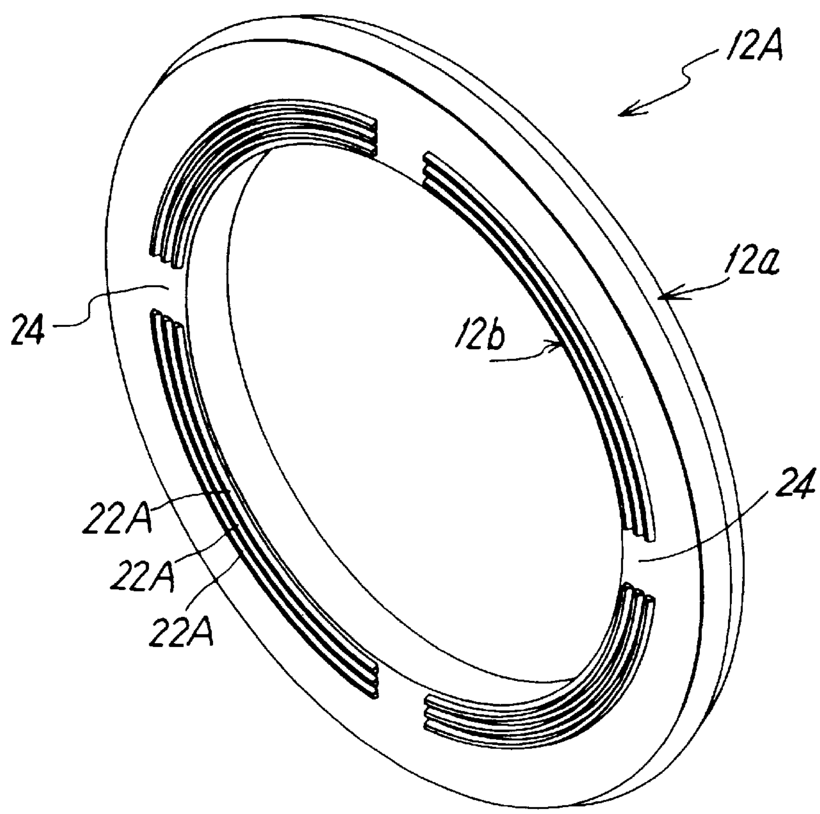
FIG. 3 is a perspective view showing an example of a packing used for the spool.

As shown in FIG. 3, the first portion 12*a* of the annular packing 12A is formed so as to have a larger packing radial length than the second portion 12*b* and a slightly smaller thickness than that of the second portion 12*b*, and is fitted into the wider portion 16*a* of FIG. 2 in the mounting groove 16 in such a way as to maintain a space between itself and the groove wall.

In addition, a plurality of annular fixing protrusions 22A located concentrically around the central axis of the packing 12A are formed on both sides of the second portion 12*b*. The fixing protrusions 22A are pressure-contacted with the groove wall of the narrower portion 16*b* of the mounting groove 16 while being compressed to allow the packing 12A to be fixedly mounted in the mounting groove 16. In this case, to prevent compressed air from being contained in a groove bottom space 19 between the inner circumferential surface of the packing and the bottom of the mounting groove 16, a plurality of ventilating recessed groove portions 24 in FIG. 3 crossing each of the fixing protrusions 22A in the radial direction are formed on both sides of the second portion 12*b* at equal intervals. The recessed groove portions 24 serve to open the groove bottom space 19 of FIG. 2 to the exterior of the mounting groove 16.

Each fixing protrusion 22A is formed of one annularly continuous line, with part of the protrusion removed in the radial direction to form the recessed groove portion 24 seen in FIG. 3. The fixing protrusion 22A has an arbitrary cross section taking the shape, for example, of a trapezoid, a triangle, or a sine curve.

When the packing 12A is fitted into the mounting groove 16 of FIG. 2 while using an appropriate jig to extend the diameter of the packing 12A, the second portion 12*b* fits into the narrower portion 16*b* and the first portion 12*a* into the wider portion 16*a*. The plurality of fixing protrusions 22A on the sides of the second portion 12*b* are pressure-contacted with the groove wall of the narrower portion 16*b* while being compressed, with the pressure-contacting force allowing the packing to be fixed in the mounting groove 16.

In this case, if the plurality of fixing protrusions 22A are concentrically formed and each fixing protrusion 22A is pressure-contacted with the groove wall of the narrower portion 16*b*, the packing 12A can be mounted using only weak force to sequentially deform the plurality of fixing protrusions 22A, making mounting easy to perform. Since the pressure-contacting force effected by the plurality of fixing protrusions 22A is added after mounting, the total pressure-contacting force allows the packing to be firmly mounted even if the pressure-contacting force provided by the individual fixing protrusion 22A is weak.

In FIG. 3, due to the recessed groove portions 24 formed in the sides of the second portion 12*b* in such a way as to cross the fixing protrusions 22A, compressed air is prevented from being contained in the groove bottom space 19 in FIG. 2 during the mounting of the packing 12A, thereby enabling an easy mounting operation and precluding the packing 12A from floating to increase the sliding resistance or from slipping out from the mounting groove 16.

Furthermore, the first portion 12*a* is formed so as to be longer than the second portion 12*b* and to be slightly thinner than the second portion 12*b*, so the first portion 12*a* is fitted into the wider portion 16*a* of the mounting groove 16 in such a way as to maintain a space between itself and the groove wall. Consequently, during the sliding of the spool, the first portion 12*a* can deform flexibly in the wider portion 16*a* to reduce sliding resistance to the spool.

Figure 4:
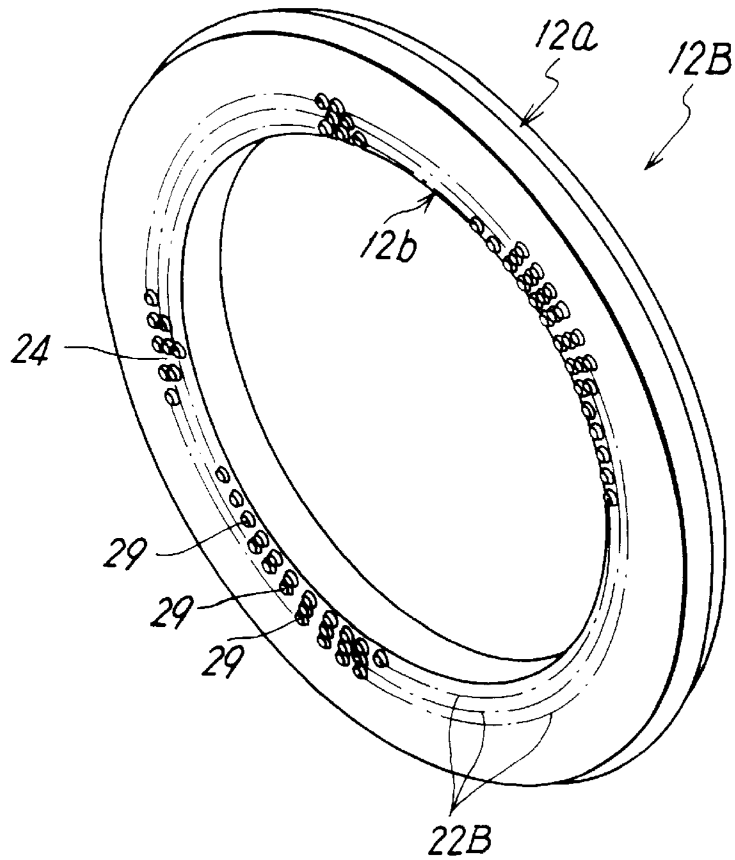
FIG. 4 is a perspective view showing another example of a packing.

FIG. 4 shows another example of a packing. A packing 12B differs from the packing 12A shown in FIG. 3 in that each fixing protrusion 22B is formed of a plurality of small independent protrusions 29 arranged like an annulus ring. The gap between the adjacent protrusions 29 forms the recessed groove portion 24.

The shape of the small protrusion 29 is arbitrary and may be cylindrical, prismatic, or undefined.

The other configuration of this example is substantially the same as in the packing 12A in FIG. 3, so a detailed description of it is omitted.

Figure 5:
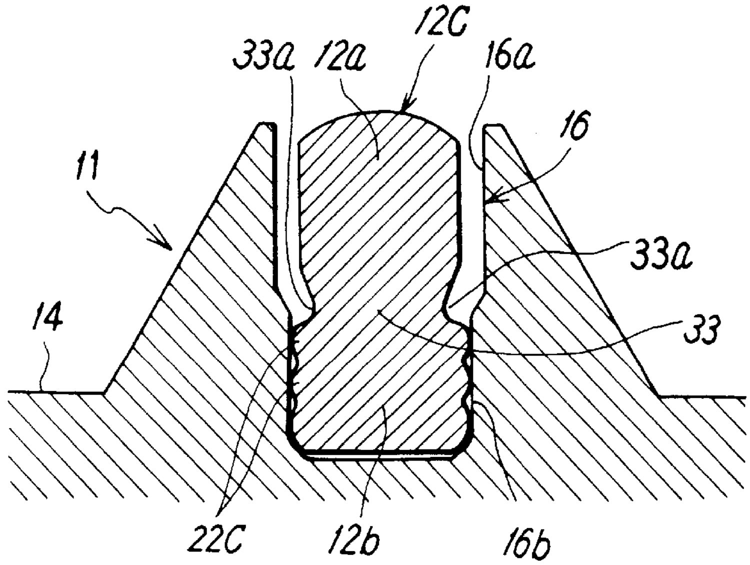
FIG. 5 is an enlarged sectional view of a spool in which a different packing is mounted.

FIG. 5 shows the integral part of a spool in which still another packing is mounted. The packing 12C differs from the packings 12A and 12B shown in FIGS. 3 and 4 in that a constricted portion 33 is provided between the first and second portions 12*a* and 12*b* to improve the flexibility of the packing 12C. The constricted portion 33 may be formed all over the circumference of the packing 12C, but may also be split at an interval. The constricted portion 33 is formed by providing a recessed portion 33*a* in both surfaces of the packing 12C.

The formation of the constricted portion 33 improves the flexibility of the packing 12C to further reduce sliding resistance.

Fixing protrusions 22C on the packing 12C may be continuous lines as in the packing 12A shown in FIG. 3 or a series of small protrusions as in the packing 12B shown in FIG. 4.

What is claimed is:

1. A spool comprising:

a bar-shaped spool body including at least one constricted portion forming an air channel, at least one seal land located adjacent to the constricted portion, and an annular packing mounting groove formed in the seal land in a circumferential direction; and an annular packing mounted in said mounting groove;

wherein said mounting groove includes a wider portion located on an opening side of the groove and a narrower portion located on a bottom side, said wider portion being formed so as to be deeper than the narrower portion;

wherein said packing includes a first portion that fits into the wider portion of said mounting groove and a second portion that fits into the narrower portion, with the second portion having on both sides a plurality of concentric fixing protrusions that are pressure-contacted with a groove wall of said narrower portion to fix the packing in the mounting groove; and wherein said packing also includes at least one ventilating recessed groove portion that crosses the fixing protrusions in a radial direction of the packing.

2. A spool according to claim 1 wherein each of said fixing protrusions is formed so as to be continuously arcuate and is partly cut out to form said recessed groove portion.

3. A spool according to claim 1 wherein each of said fixing protrusions is formed by annularly arranging a plurality of small independent protrusions so that a gap between adjacent protrusions forms said recessed groove portion.

4. A spool according to claim 1 wherein the first portion of said packing is thinner than the second portion.

5. A spool according to claim 1 or 4 wherein said packing has a constricted portion in at least part of an intermediate area between the first and second portions to improve flexibility.

* * * * *